United States Patent [19]
Biersach

[11] Patent Number: 5,006,391
[45] Date of Patent: Apr. 9, 1991

[54] HONEYCOMB STRUCTURE AND METHOD OF MAKING SAME

[76] Inventor: James R. Biersach, 511 Kimberlee Drive N., Baxter, Minn. 56401

[21] Appl. No.: 424,947

[22] Filed: Oct. 23, 1989

[51] Int. Cl.⁵ ............................................. B32B 3/12
[52] U.S. Cl. ................................. 428/116; 156/153; 156/292
[58] Field of Search ...................... 156/197, 292, 153; 428/73, 116, 117, 118

[56] References Cited
U.S. PATENT DOCUMENTS

| | | | |
|---|---|---|---|
| 2,477,852 | 8/1949 | Bacon | 428/116 |
| 2,839,442 | 6/1958 | Whitaker | 428/116 X |
| 3,007,834 | 11/1961 | Moeller et al. | 428/116 X |
| 3,483,070 | 12/1969 | Kennedy et al. | 428/118 |

Primary Examiner—Henry F. Epstein
Attorney, Agent, or Firm—Henry C. Kovar

[57] ABSTRACT

A new and improved honeycomb core and honeycomb panel are provided with a new method of making honeycomb cores and panels. The honeycomb core is fabricated from conventional or higher quality corrugated fiberglass sheet and the honeycomb panel has a resin core that is fiber filled for strength. The method of making the core sheet has the steps of providing corrugated rigid resin panels, abraiding the corrugation apexes on both sides of the corrugated panels, applying adhesive on the abraided apexes, stacking the corrugated panels with every other corrugated panel being flipped over so that the apexes face each other, bonding the apexes and therefore the corrugated panels together to form a core block, and then sawing desired thicknesses of core sheets off of the core blocks. The core sheets are subsequently bonded into finished honeycomb panels.

12 Claims, 3 Drawing Sheets

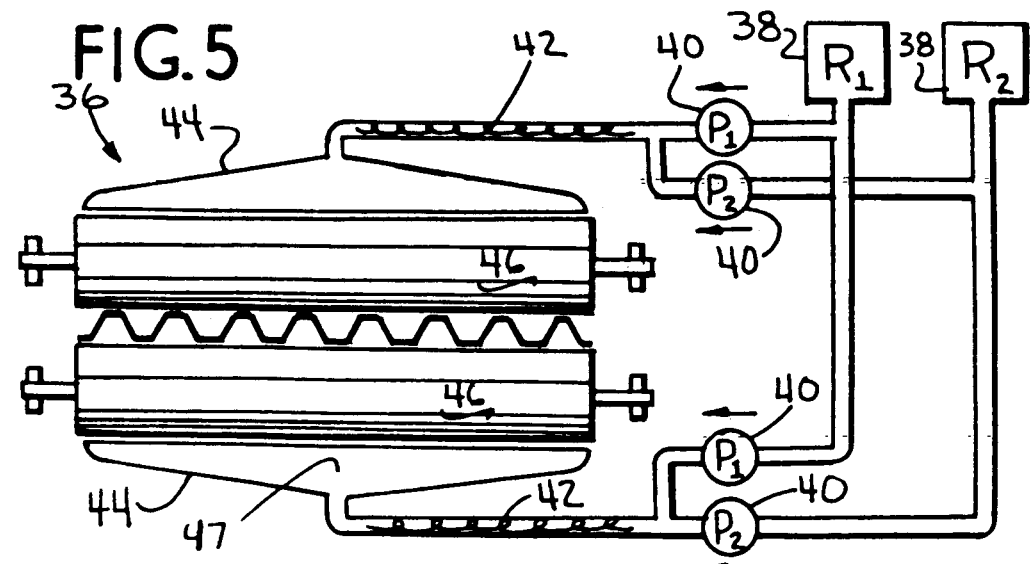
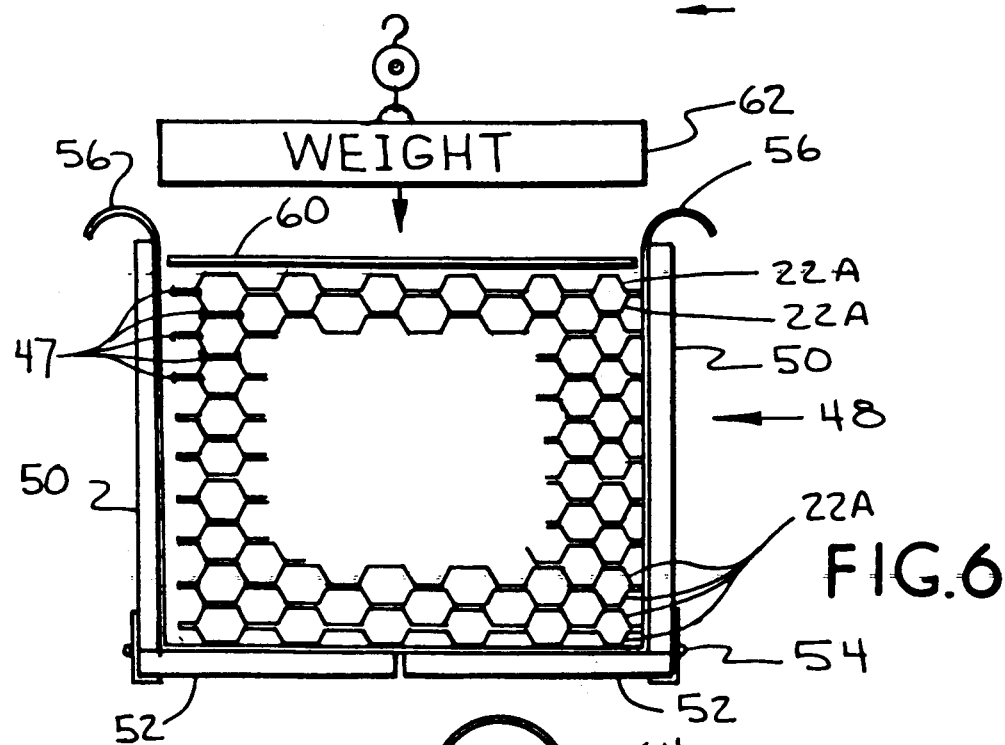
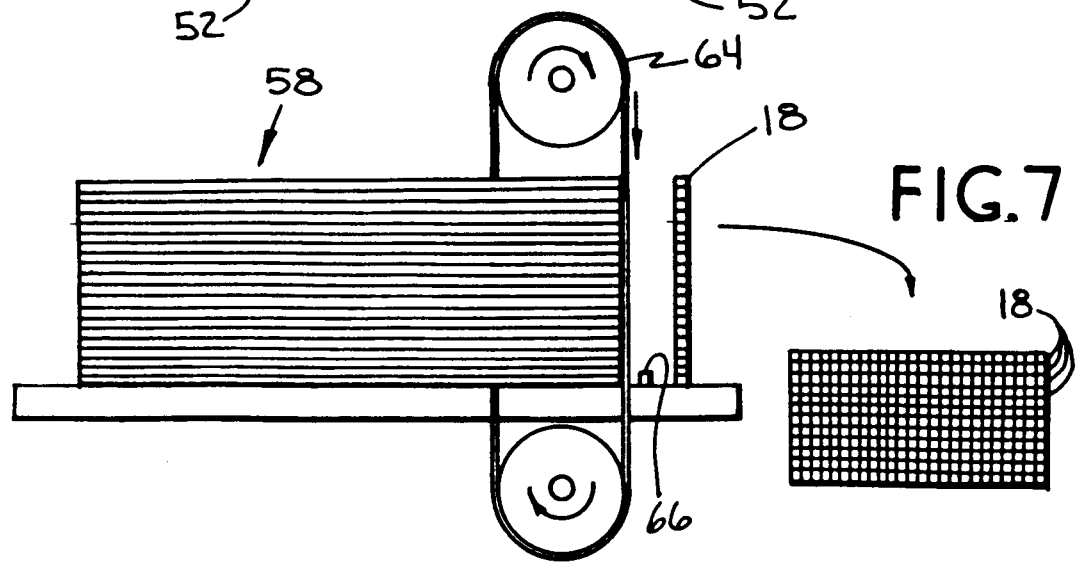

HONEYCOMB STRUCTURE AND METHOD OF MAKING SAME

BACKGROUND OF THE INVENTION

1. Field of the Invention

This invention pertains to a new honeycomb structure and to a new method of making structural honeycomb.

2. The Prior Art

Honeycomb is generally described as a structure of hexagonal thin walled cells. Most honeycomb structural panels have a central core of thin walled cells, and a structural skin secured on the outer surface of each side of the core, with the skins being normal to an axis of the cells. The cells can be either exactly or approximately hexagonal, or square or of some other geometric shape.

The most commonly encountered honeycomb structures in nature are bee, wasp and hornet made structures.

Man made honeycomb structures are being used for many purposes. The typical use will require light weight, stiffness and high strength. Typical actual specific honeycomb uses are floors in aircraft and load carrying vehicles, platforms, walls and building panels, doors, sporting equipment, pallets and skids, and packaging. These specific uses will typically have a structural skin on both sides of the core.

Honeycomb core with a skin on only one side also has utility and is used for material handling and distribution, ammunition storage, fuel cell cores, molding and for other purposes.

A wide variety of materials have been and are used as outer structural skin material, ranging from simple cardboard to the most esoteric fiber filled resins of the aerospace and armor industries.

Material usage in the honeycomb core has, however, been restricted to lesser performance materials such as paper, cardboard, and aluminum. All these core materials have corrosion suceptibility problems and none are effectively useable in water and many other corrosive liquids and environments.

The paper and cardboard cores degrade when wet, and both the paper and aluminum cores are attacked by bases or acids.

Usage of these honeycomb structures has been limited to dry and somewhat protected environments.

The core materials being used have not been of particularly high strength. The aluminum honeycomb must use an alloy that can be formed to make the cellular structure and the extremely high strength relatively brittle alloys used for flat panel aerospace applications cannot be effectively used.

There is only one known example of fiber reinforced resin honeycomb core in use, and it is available under the Hexcel brand name. This particular material is a long fiber made into something resembling paper, which is provided in a soft non-rigid form. Specifically it's in a folding accordian type structure that can be compressed and stretched and matched to single plane or compound contours. It is available in a maximum thickness of about 6 mm (0.24 inch) and costs about $18 per square foot. This material is then bonded and made rigid by being dipped one or more times in a penetrating resin. The more times you dip this core, the more resin you build up. The specific end uses of this core material are not fully known but its cost must restrict its effective use to aerospace and/or military end uses.

OBJECTS OF THE INVENTION it is an object of this invention to provide a new honeycomb structure having an improved fiber and resin core.

it is an object of this invention to provide an improved honeycomb core of corrugated fiberglass.

it is an object of this invention to provide a new honeycomb panel having at least one surface sheet and an improved attached fiberglass cellular structure.

it is an object of this invention to provide a new method of making honeycomb core.

It is an object of this invention to provide a new method of making honeycomb panel with an improved fiberglass cellular structure.

SUMMARY OF THE INVENTION

A new honeycomb core has a plurality of corrugated ribbons of rigid resin panel, the apexes of the ribbons are abraided and permanently bonded together.

A new honeycomb panel has at least one surface sheet and a honeycomb structure secured to one side of the surface sheet, the honeycomb structure is formed by a plurality of corrugated cell walls which are sublengths of a corrugated rigid resin panel.

A honeycomb panel has first and second surface sheets, a honeycomb core devised of corrugated rigid resin panel, and adhesive permanently securing the sheets to each side of (he core.

A method of making honeycomb core has the steps of preparing outer apexes on both sides of a rigid corrugated plastic panel for adhesive bonding, applying adhesives on the prepared apexes, placing the panels in a stack, curing the stack to form a core block, and cutting core sheets off of the core block.

A method of making honeycomb core has the steps of providing a plurality of pieces of rigid corrugated fiber reinforced plastic panel, arranging the pieces in position against each other with corrugation apexes of adjacent pieces being abutted against each other, and permanently bonding the abutted apexes to each other to form the honeycomb panel.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 5 is an elevational view of the adhesive application to the processed core structure from FIGS. 2 & 3;

FIG. 6 is an elevational view of the bonding of the core structure from FIG. 5;

FIG. 7 is an elevational view showing the cutting of the new honeycomb core sheets;

DESCRIPTION OF THE PREFERRED EMBODIMENT

Figure 1:
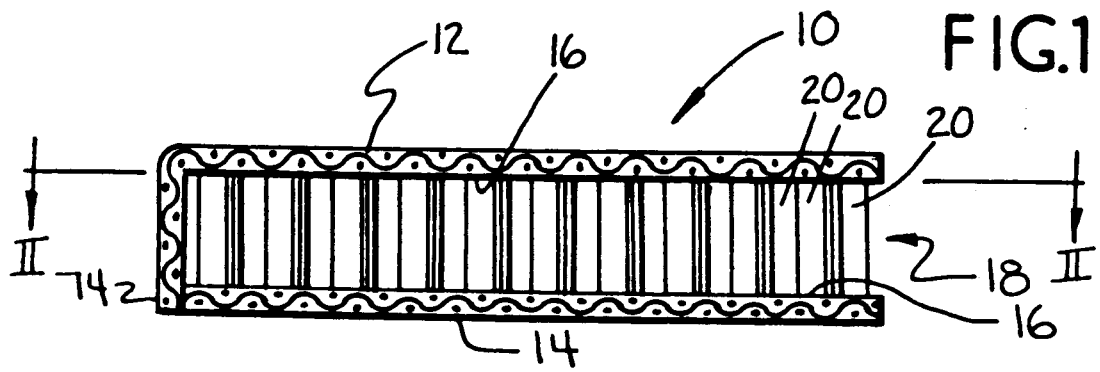
FIG. 1 is an elevational view of the preferred embodiment of the honeycomb panel of the present invention.
Figure 2:
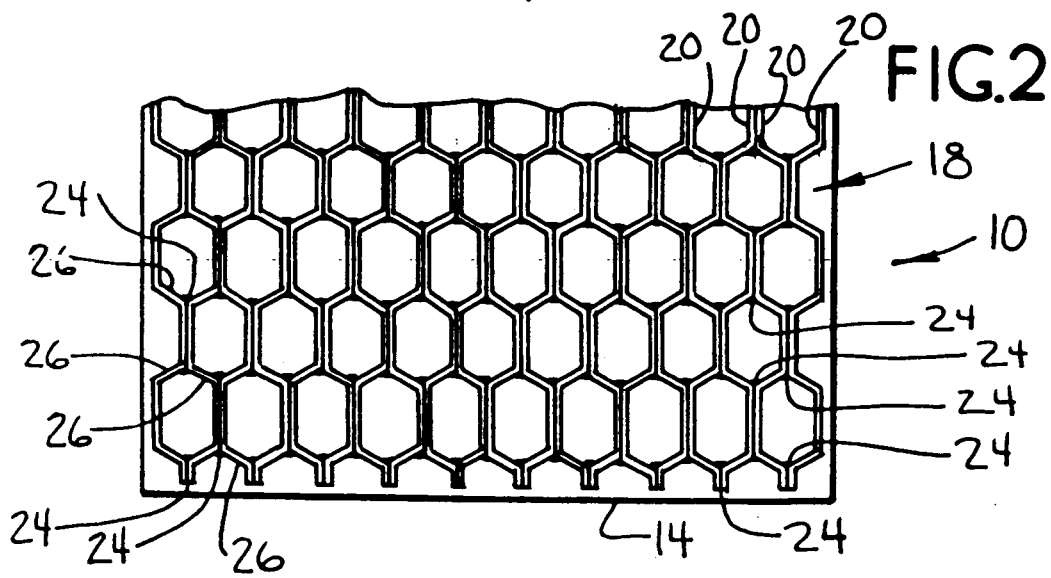
FIG. 2 is a plan view in section through lines II of FIG. 1.

In accordance with the principles of the present invention, the preferred embodiment of the new and improved honeycomb panel of the present invention is shown in FIGS. 1 and 2 and generally designated by the numeral 10, and hereinafter referred to as the panel 10 for brevity.

The panel 10 has at least one and usually two outer surface sheets 12, 14 which are spaced apart from each other and which are of a conventional material such as wood, fiber resin, metal, ceramic and so on. The inner surface of each surface sheet 12, 14 has a layer of appropriate adhesive 16 which is preferably an irreversible two-part reactive structural adhesive such as an epoxy resin. Within the surface sheets 12, 14 and the adhesive 16 is a new honeycomb core sheet 18 which is an important part of this invention. The core sheet 18 is permanently bonded to the surface sheets 12, 14 with and by the adhesive layers 16.

The core sheet 18 is comprised of a plurality of ribbons 20 of rigid corrugated resin panel pieces, which preferably are fiber filled for structural re-inforcement. These ribbons 20 are cut either singularly or in bonded pluralities from one or more rigid corrugated resin panels 22 as will be explained.

Figure 3:
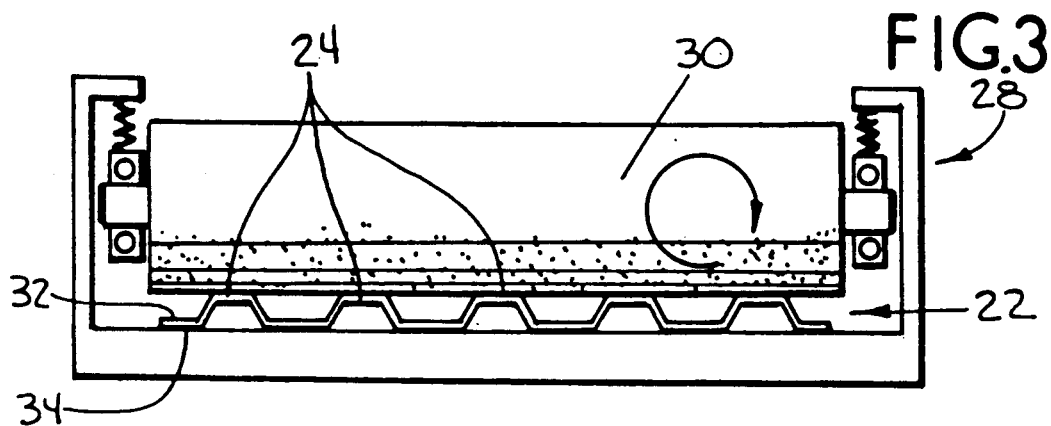
FIG. 3 is an elevational view of the processing of the core structure.
Figure 4:
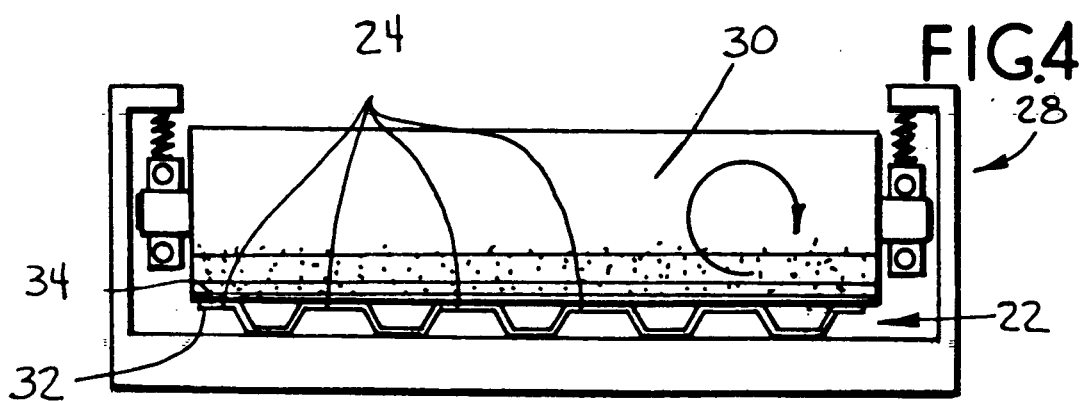
FIG. 4 is a second elevational view of the processing of the core structure.

Each panel 22 as shown in FIGS. 3 and 4 is a panel of nominal width and length, for example 4 feet wide and 12 feet long. The panel 22 has a plurality of corrugations that run the length of the panel 22 and which are usually uniformly spaced from each other across the transverse width. On each side of each panel 22 and therefore each ribbon 20 is a plurality of corrugation apexes 24 which define the outermost surfaces on each side of the panel. The apexes 24 are preferably flats, and each apex has a transverse flat dimension which is at least ⅓ the transverse width of a complete corrugation waveform. In between opposing apexes 24 are thickness legs 26. The panels 22 of conventional build are commonly found in lumber yards and are used for the conventional construction of buildings, roofs, walls, shelters, and so forth. Be it understood that high cost and high performance aerospace resins and fibers are also usable as material for the panels 22 and ribbons 20 and that various extrusion and/or formed profiles of the panels 22 and ribbons 20 are usable in this invention. However, the invention is particularly cost effective with fiberglass reinforced polyester resin panels.

In the method of making the ribbons 20 and the core sheet 18, the entire panel 22 is firstly prepared for being a honeycomb material by being run through a sander 28 which has an abrasive wheel or belt 30 that abraids the entire surface of each and every corrugation apex 24 on a first side 32 of the panel 22. The panel 22 is then flipped over and again run through the sander 28 which abraids entirely, each and every surface of every corrugation apex 24 on the second side 34 of the panel 22. On high production facilities, it is recognized that a double wheel sanding machine can abraid both panel sides 32, 34 at one time and during a single pass.

The abraided panel 22A is then run through an adhesive application machine 36 as shown in FIG. 5, which has vats 38 for adhesive parts 1 and 2, adhesive pumps 40, adhesive mixers 42, adhesive spreaders 44 and application rollers 46. Alternatively the core adhesive 47 can be applied by hand with rollers or brushes. Regardless, core adhesive 47 is applied to all the prepared apex surfaces 24 on at least one panel side 32 and also preferably on the apex surfaces 24 of the second panel side 34. The prepared panels 22A with the core adhesive 47 thereon are then transferred to the honeycomb core jig 48.

The core jig 48 as shown in FIG. 6 is a box having sides 50, ends (not shown) and single or double bottom doors 52 on hinges 54. The doors 52 lock in the closed position and a single use expendible box liner 56 is used for each cycle of core block fabrication. The preferred liner 56 is polyethylene film. The jig 48 is sized to be a reasonably close fit for the panels 22 so that the panels 22 align themselves one upon another. A plurality of prepared and adhesived panels 22A are placed into the jig 48 as shown. Each succesive panel 22A is flipped or inverted. Specifically as an example the first and bottom panel 22A will have the first side 32 down and a second side 34 up and the second panel 22A will have its first side 32 up and its second side 34 down. All of the odd numbered panels 22A (i.e. panels 1, 3, 5, 7, 9, 11, and so forth as counted from the bottom) will be like the bottom panel 22A and all of the even numbered panels 22A (i.e. panels 2, 4, 6, 8, 10, 12 and so forth) are all positioned like the second panel 22A. The total number of panels 22A placed in the jig 48 determines the height of the core block 58. When the desired quantity of prepared and adhesived panels 22A have been placed in the jig 48, a liner top 60 is placed upon the top panel 22A and a ballast weight 62 is placed atop the stack of panels 22A. The stack of panels 22A is then cured whereupon core adhesive 47 irreversibly sets and the individual panels 22A are all irreversibly structurally adhesively bonded to each other to form and finish the bonded core block 58. The doors 52 are then opened and the core block 58 is removed. Alternatively, the core block 58 may be removed by pulling the liner 56 up and out of the core jig 48, with the block 58 in the line 56.

The core block 58 is then taken to a bandsaw 64, as shown in FIG. 7, wherein an adjustable stop 66 is set to produce a desired thickness of core sheet 18 and, the individual honeycomb core sheets 18 are cut off of the core block 58 and arranged in a stack as shown. The core sheet 18 will typically be sawed with parallel sides and a constant thickness. However, variable thicknesses and curved cuts are also easily done.

Figure 8:
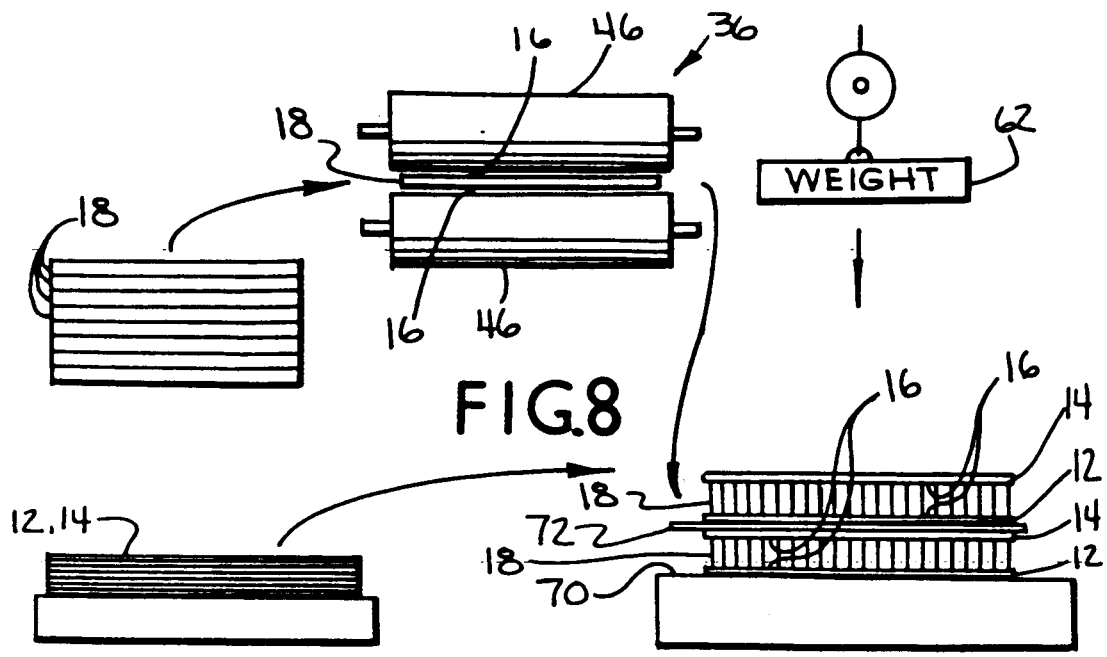
FIG. 8 is a process flow diagram of the assembly of the completed core panels.

As shown in FIG. 8, the stack of core sheets 18 and a corresponding stack of surface sheets 12 14 are then taken to the adhesive machine 36. The core sheet 18 rather than the surface sheets 12, 14, is preferably run through the machine 36 to minimize the consumption of adhesive 16 and to minimize the weight of the finished panels 10. A surface sheet 12 is placed on a support surface 70, the adhesived coated core sheet 18 is placed atop the first surface sheet 12, a second surface sheet 14 is then placed atop the core sheet 18, a release sheet 72 is placed atop the assembled panel 10, and a second set of surface panels 12, 14 and core sheet 18 are stacked up, and this is repeated to assemble a stack of assembled and adhesived panels 10. The weight 62 (or a different weighting structure such as pressure or vacuum bags) is then placed atop the stack of assembled panels 10 and the stack of honeycomb panels 10 and the adhesive 16 is cured whereupon the cured honeycomb panels 10 are permanently bonded together and completed.

Referring back to FIGS. 1 and 2, it can now be appreciated that the core sheet 18 within the honeycomb panel 10 has a plurality of corrugated rigid resin ribbons 20 which preferrably are fiber reinforced, that are arranged with these prepared and abraided apexes 24 abutted against each other and permanently bonded to each other with adhesive 47, which may be identical to the surface sheet adhesive 16 composition. All of the ribbons 20 are of identical height when it is intended to have the surface sheets 12, 14 parallel to each other. The complete honeycomb panel 10 is then ready for subsequent processing into a finished product. Examples of finished products include shelving, flooring, bulkheads, diving boards, docks, wall panels, partitions, ramps, pallets, swimming platforms, pontoon boat decks and the like. The preferred core sheet 18 has ribbons 20 taken from a panel 22 which has corrugation apexes 24 with flats that enhance preparation and bonding. The preferred cellular profile is generally hexagonal as seen in FIG. 2, but may also be generally square or of other configurations.

Figure 9:
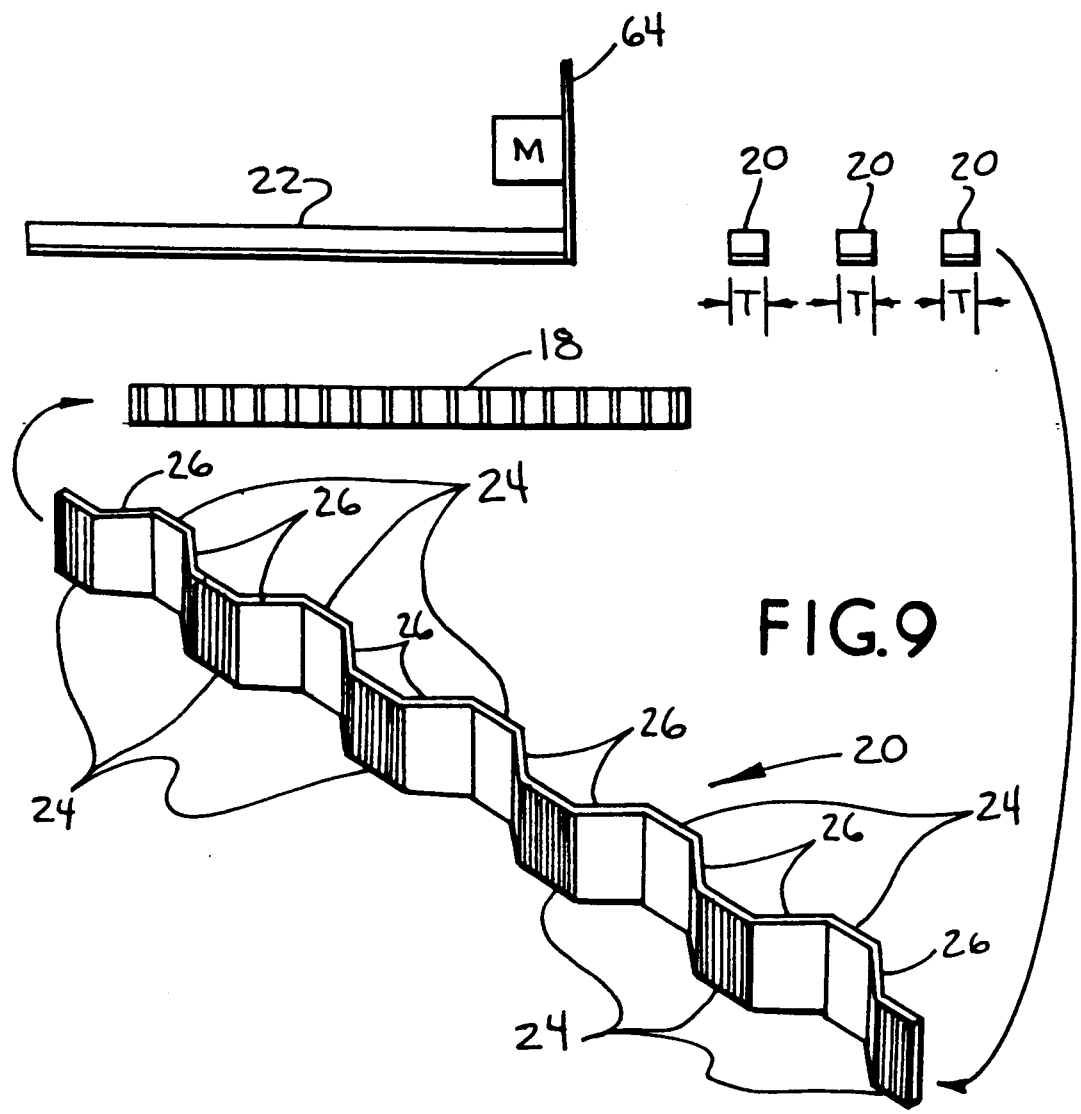
FIG. 9 is an alternative process flow diagram.

FIG. 9 illustrates a process wherein a prepared and abraided single corrugated panel 22 is sliced by the saw 64 to make individual core ribbons 20 that are subsequently bonded into a single layer core sheet 18 which may be flat or have single or multiple curvature of its surfaces.

Returning to FIG. 1, an integral flange 74 is shown on the surface sheet 12. The flange 74 is extendible around the entire periphery of the first surface sheet 12 providing hermetic sealing to the second surface sheet 14 during assembly and bonding of the finished honeycomb panel 10.

The new and improved honeycomb core sheet 18 and the new and improved completed honeycomb core panel 10 are usable in environments where conventional and known honeycombs will be environmentally attacked and fail. Specific examples are in building construction, sporting goods, vehicles, uses submerged in and floating on water, uses in agressive chemical environments, an uses in factories.

The new methods of fabricating the core sheet 18 and the finished core panels 10 can be effectively practiced by a single person, a small business, and large businesses. The materials to practice the method and build the finished products are available at most lumber yards. The finished core panel 10 is relatively low cost and is of high economic value.

Although other advantages may be found and realized and various modifications may be suggested by those versed in the art, be it understood that 1 embody within the scope of the patent warranted hereon, all such embodiments as reasonably and properly come within the scope of my contribution to the art.

I claim as my invention:

1. An improved honeycomb core comprising
   (a) a plurality of corrugated ribbons of preformed rigid corrugated resin panels, said ribbons having mechanically abraided exterior apexes; and
   (b) adhesive permanently bonding facing pairs of said abraided apexes together.

2. The core of claim 1, in which each of said apexes has an abraided flat area with a transverse width which is at least ⅓ of the corrugation waveform.

3. The core of claim 1, in which said resin is fiber reinforced.

4. The core of claim 3, in which said ribbons are of fiberglass reinforced polyester panels and in which the entire surface of each bonded apex is abraided.

5. The core of claim 1, in which every other ribbon is flipped over to be the mirror image of the immediately adjacent and adjoined ribbons.

6. A honeycomb panel comprising
   (a) at least one surface sheet,
   (b) a honeycomb core structure permanently secured to one side of said surface sheet, said honeycomb core structure being a plurality of corrugated cell walls abutted and secured first side to second side to first side to second side and so on, said cell walls being sub-length ribbons of a preformed corrugated rigid resin panel;
   (c) mechanically abraided corrugation apexes on both sides of adjacent ribbons; and
   (d) adhesive securing opposing and abutted together abraided apexes to each other.

7. The honeycomb panel of claim 6, in which the entire abutting surface of every corrugation apex is completely abraided.

8. A honeycomb panel, comprising
   (a) first and second surface sheets,
   (b) a honeycomb core in between and spacing said surface sheets apart, said core being a plurality of corrugated ribbons from a rigid corrugated resin panel; and
   (c) mechanically abraided exterior corrugation apexes on both sides of adjacent ribbons;
   (d) adhesive permanently securing said abraided apexes to each other; and
   (e) adhesive permanently securing said surface sheets one to each side of said core.

9. The panel of claim 8, in which said panel is submersible in water, said sheets and said core being non-reactive and non-absorbant in water.

10. The panel of claim 8, in which said ribbons have abraided flat said apexes adjoined to each other, said abraided flat apexes being at least ⅓ of the width of each ribbon, the entirety of each flat apex being abraided.

11. A method of making an improved honeycomb core comprising the steps of
    (a) mechanically abraiding outer corrugation apexes on both sides of each panel in a plurality of rigid corrugated plastic panels, in preparation for adhesive bonding;
    (b) applying a layer of adhesive on the abraided apexes;
    (c) placing said panels in a stack, with said adhesive coated abraided apexes being in opposing face-to-face contact with each other;
    (d) holding said stack of panels together while curing the adhesive and bonding the abraided apexes together and thereby forming a core block; and
    (e) cutting honeycomb core sheets off of an end of the cured core block.

12. A method of making an improved honeycomb core, comprising the steps of
    (a) providing a plurality of pieces of preformed rigid corrugated fiber reinforced plastic panels;
    (b) mechanically abraiding outer corrugation apexes of each panel in preparation for adhesive bonding thereof and applying adhesive thereon;
    (c) arranging the pieces in position against each other with the abraided corrugation apexes of adjacent pieces being abutted against each other; and
    (d) permanently bonding the abutting abraided apexes to each other and forming the improved honeycomb cores from said rigid plastic panels.

* * * * *